(12) United States Patent
Park et al.

(10) Patent No.: US 10,749,210 B2
(45) Date of Patent: Aug. 18, 2020

(54) POLYMER ELECTROLYTE FOR SECONDARY BATTERY AND SECONDARY BATTERY INCLUDING THE SAME

(71) Applicant: LG Chem, Ltd., Seoul (KR)

(72) Inventors: Sol Ji Park, Daejeon (KR); Kyoung Ho Ahn, Daejeon (KR); Young Jea Kim, Daejeon (KR); Yong Jin Jang, Daejeon (KR); Joong Jin Han, Daejeon (KR); Chul Haeng Lee, Daejeon (KR)

(73) Assignee: LG Chem, Ltd. (KR)

( * ) Notice: Subject to any disclaimer, the term of this patent is extended or adjusted under 35 U.S.C. 154(b) by 279 days.

(21) Appl. No.: 16/067,964

(22) PCT Filed: Oct. 30, 2017

(86) PCT No.: PCT/KR2017/012077
§ 371 (c)(1),
(2) Date: Jul. 3, 2018

(87) PCT Pub. No.: WO2018/080259
PCT Pub. Date: May 3, 2018

(65) Prior Publication Data
US 2020/0014064 A1   Jan. 9, 2020

(30) Foreign Application Priority Data

Oct. 31, 2016 (KR) .................. 10-2016-0143353
Oct. 27, 2017 (KR) .................. 10-2017-0140768

(51) Int. Cl.
*H01M 10/0565* (2010.01)
*C08G 81/00* (2006.01)
*H01M 10/0569* (2010.01)

(52) U.S. Cl.
CPC ........ *H01M 10/0565* (2013.01); *C08G 81/00* (2013.01); *H01M 10/0569* (2013.01); *H01M 2300/0025* (2013.01); *H01M 2300/0085* (2013.01)

(58) Field of Classification Search
CPC ...... H01M 10/0565; H01M 2300/0085; C08G 81/00
USPC .......................................................... 429/303
See application file for complete search history.

(56) References Cited

U.S. PATENT DOCUMENTS

| | | |
|---|---|---|
| 2009/0163692 A1 | 6/2009 | Moore et al. |
| 2016/0056502 A1 | 2/2016 | Kim et al. |
| 2016/0233475 A1 | 8/2016 | Son et al. |
| 2017/0170516 A1 | 6/2017 | Desmurs et al. |

FOREIGN PATENT DOCUMENTS

| | | |
|---|---|---|
| KR | 101059197 B1 | 8/2011 |
| KR | 20150045361 A | 4/2015 |
| KR | 20160024411 A | 3/2016 |
| KR | 2016-0037616 A | 4/2016 |
| WO | 2016012669 A1 | 1/2016 |

OTHER PUBLICATIONS

Search report from International Application No. PCT/KR2017/012077, dated Feb. 12, 2018.

*Primary Examiner* — James M Erwin
(74) *Attorney, Agent, or Firm* — Lerner, David, Littenberg, Krumholz & Mentlik, LLP

(57) ABSTRACT

The present invention provides a polymer electrolyte for a secondary battery having high ionic conductivity, and a lithium secondary battery including the same.

14 Claims, 1 Drawing Sheet

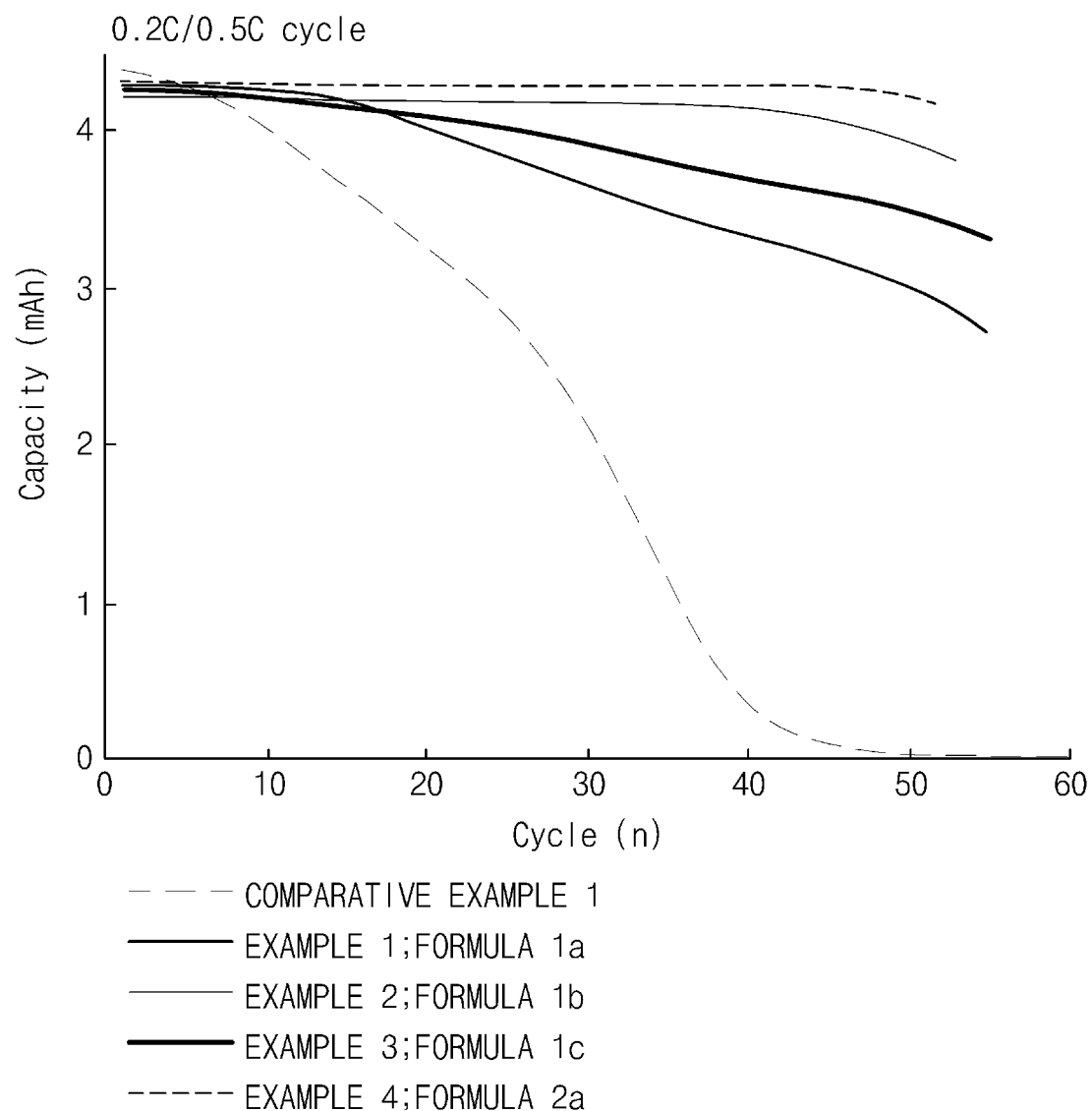

POLYMER ELECTROLYTE FOR SECONDARY BATTERY AND SECONDARY BATTERY INCLUDING THE SAME

CROSS-REFERENCE TO RELATED APPLICATIONS

The present application is a national phase entry under 35 U.S.C. § 371 of International Application No. PCT/KR2017/012077, filed on Oct. 30, 2017, which claims the benefit of Korean Patent Application Nos. 10-2016-0143353, filed on Oct. 31, 2016, and 10-2017-0140768, filed on Oct. 27, 2017, the disclosures of which are incorporated herein by reference.

TECHNICAL FIELD

The present invention relates to a polymer electrolyte for a secondary battery and a secondary battery including the same.

BACKGROUND ART

There is a growing demand for high performance, high stability secondary batteries as electric, electronic, communication, and computer industries have rapidly developed. Particularly, in line with miniaturization and lightweight trends of electronic (communication) devices, thin-film and miniaturized lithium secondary batteries, as core components in this field, are required.

Lithium secondary batteries may be divided into a lithium ion battery using a liquid electrolyte and a lithium polymer battery using a polymer electrolyte depending on the electrolyte used.

With respect to the lithium ion battery, it may have high capacity, but, since the liquid electrolyte containing a lithium salt is used, there may be a risk of leakage and explosion and battery design may be complicated to prepare for the risk.

With respect to the lithium polymer battery, since a solid polymer electrolyte or a gel polymer electrolyte containing an electrolyte solution is used as the polymer electrolyte, stability is improved and, simultaneously, flexibility is obtained, and thus, the lithium polymer battery may be developed in various forms, for example, in the form of small or thin-film batteries. In particular, in a case in which the gel polymer electrolyte is used, since the number of components used in the preparation of the lithium secondary battery may be reduced, a cost-saving effect may also be expected.

However, since the polymer electrolyte has significantly lower ionic conductivity than the liquid electrolyte, the polymer electrolyte may not be suitable for commercialization.

For example, with respect to polyethylene oxide which has been widely used as the polymer electrolyte, it has an excellent ability to dissociate an ion conductive metal salt despite the fact that it is in a solid state. That is, since cations of the alkali metal salt are stabilized while the cations are coordinated with oxygen atoms present in the polyethylene oxide to form a complex, the cations may be present in a stable ionic state without a solvent. However, since the polyethylene oxide has a semi-crystalline structure at room temperature to interfere with the movement of the metal salt in which a crystal structure is dissociated, it is disadvantageous in that energy characteristics are degraded, for example, it has a low ionic conductivity value of about $1.0 \times 10^{-8}$ S/cm at room temperature. Thus, it may not be suitable for commercialization.

Recently, a hybrid polymer electrolyte or gel polymer electrolyte, in which an ionic conductivity of $1.0 \times 10^{-4}$ S/cm or more is obtained by adding several to nearly ten times as much as the amount of a liquid electrolyte solution to a polymer matrix, has been studied.

Typical examples of the gel polymer electrolyte may be a copolymer (Panasonic Corp) obtained by mutually copolymerizing heterogeneous monomers selected from the group consisting of polyacrylonitrile (EIC Lab. Inc.) vinyl chloride, vinyl acetate, acrylonitrile, styrene, and methyl acrylate monomer; a copolymer (Nippon Telegraph & Telephone Corporation) of a high polar monomer, such as vinyl chloride, methyl methacrylate, vinyl alcohol, and acrylic acid, and a low polar monomer such as styrene and butadiene; a polymethyl methacrylate-based copolymer having high affinity with the electrolyte solution, and a terpolymer (Samsung General Chemicals). However, with respect to a conventional polymer electrolyte, it is difficult to prepare the polymer electrolyte having both excellent mechanical properties and lithium ion conductivity.

Thus, there is an urgent need to develop a polymer electrolyte material having high ionic conductivity, processability, and mechanical properties while maintaining a solid phase.

PRIOR ART DOCUMENT

Korean Patent No. 10-1059197

DISCLOSURE OF THE INVENTION

Technical Problem

An aspect of the present invention provides a polymer electrolyte for a secondary battery having high ionic conductivity.

Another aspect of the present invention provides a lithium secondary battery in which cycle life characteristics and oxidation stability are improved by including the polymer electrolyte for a secondary battery.

Technical Solution

According to an aspect of the present invention, there is provided a polymer electrolyte for a secondary battery including a polymer which includes at least one repeating unit of:
repeating unit A represented by Formula 1, and
repeating unit B represented by Formula 2:

[Formula 1]

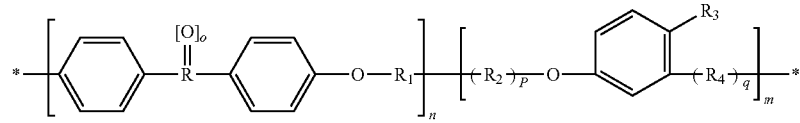

[Formula 2]

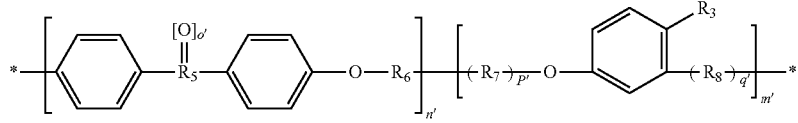

wherein, in Formula 1 or 2,
R and $R_5$ are carbon (C) or sulfur (S),
$R_1$ and $R_6$ are

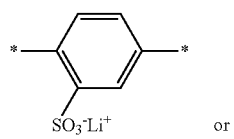 or

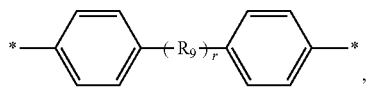

wherein $R_9$ is $-C(CF_3)_2-$,
$R_2$ and $R_7$ are,

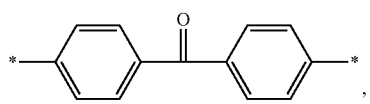 [SMILES: *c1ccc(C(=O)c2ccc(*)cc2)cc1]

$R_3$ is $-S(CF_2)_2SO_3^-Li^+$,
$R_4$ is

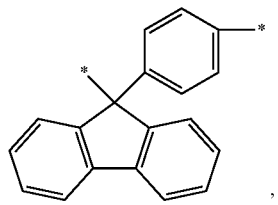

wherein $R_{10}$ is $-C(CF_3)_2-$,
$R_8$ is

[fluorene structure], o and o' are 1 or 2,
p, p', q, q', r, and s are 0 or 1,
each of n, m, n', and m' is the number of moles of repeating units,
a ratio of n:m is in a range of 95:5 to 5:95, and
a ratio of n':m' is in a range of 95:5 to 5:95.

Specifically, in Formula 1, the ratio of n:m may be in a range of 40:60 to 60:40, and, in Formula 2, the ratio of n':m' may be in a range of 40:60 to 60:40.

Also, the polymer including the repeating unit represented by Formula 1 or 2 may have a weight-average molecular weight (Mw) of 5,000 g/mol to 2,000,000 g/mol.

Specifically, the repeating unit represented by Formula 1 may include at least one selected from the group consisting of those represented by Formulae 1a to 1c:

[Formula 1a]

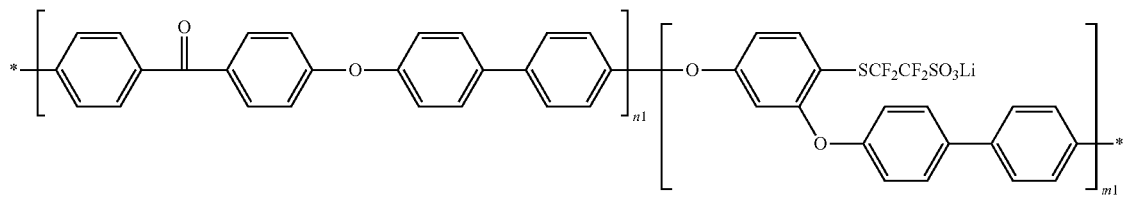

wherein, in Formula 1a,
n1 and m1 are the number of moles of repeating units, and
a ratio of n1:m1 is in a range of 95:5 to 5:95,

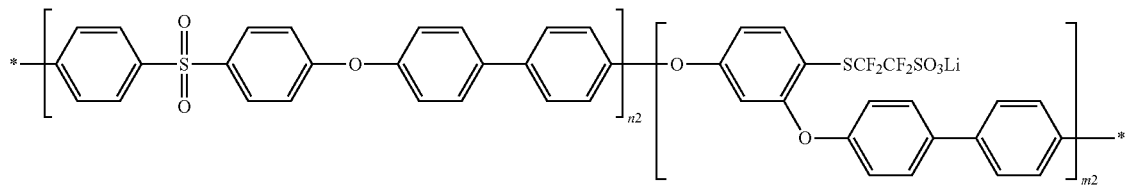

[Formula 1b]

wherein, in Formula 1b,
n2 and m2 are the number of moles of repeating units, and
a ratio of n2:m2 is in a range of 95:5 to 5:95,

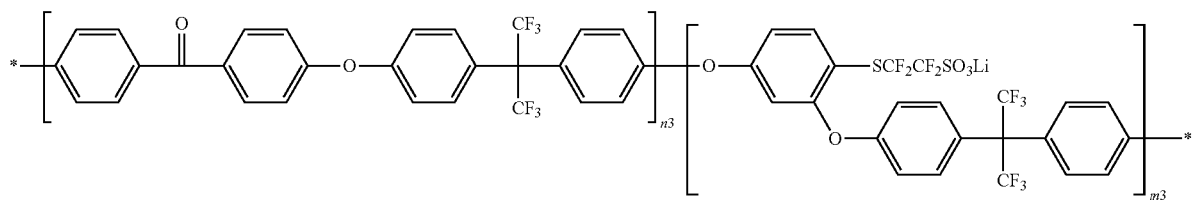

[Formula 1c]

wherein, in Formula 1c,
n3 and m3 are the number of moles of repeating units, and
a ratio of n3:m3 is in a range of 95:5 to 5:95.

Also, the repeating unit represented by Formula 2 may include one represented by Formula 2a:

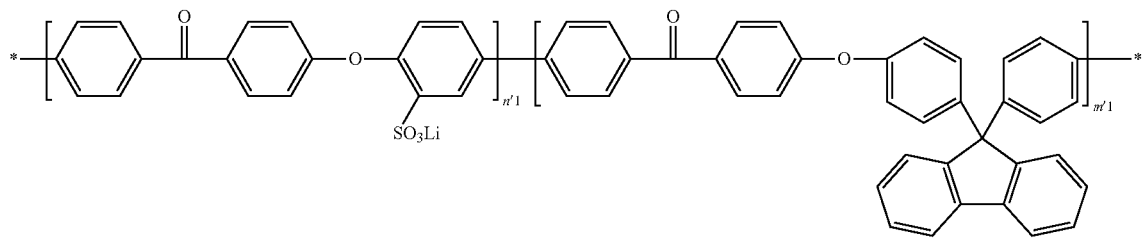

[Formula 2a]

wherein, in Formula 2a,
n'1 and m'1 are the number of moles of repeating units, and
a ratio of n'1:m'1 is in a range of 95:5 to 5:95.

The polymer electrolyte for a secondary battery may be a free-standing solid polymer electrolyte or a gel polymer electrolyte.

In this case, the gel polymer electrolyte may further include an electrolyte solution including a lithium salt and an organic solvent.

Also, the gel polymer electrolyte may further include an ionic liquid.

According to another aspect of the present invention, there is provided a lithium secondary battery including:
a positive electrode; a negative electrode; and a polymer electrolyte formed on at least one surface of the positive electrode and the negative electrode, wherein the polymer electrolyte includes the polymer electrolyte for a secondary battery of the present invention.

The lithium secondary battery may further include a separator, and, in this case, the polymer electrolyte may be formed on at least one surface of the positive electrode, the negative electrode, and the separator.

Specifically, in an embodiment of the present invention, provided is a polymer electrolyte for a secondary battery which includes a polymer including at least one unit of:

repeating unit A represented by Formula 1 below; and
repeating unit B represented by Formula 2 below.

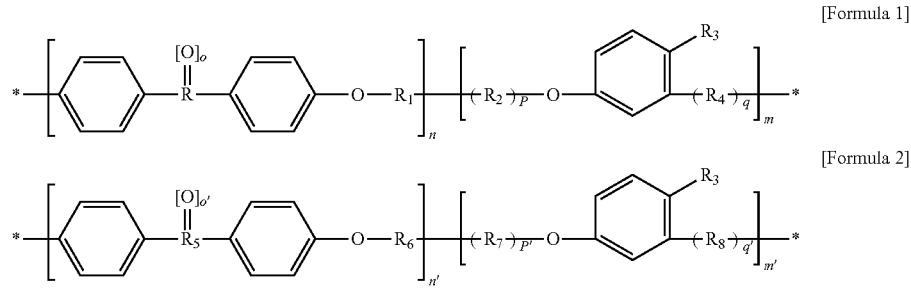

[Formula 1]

[Formula 2]

Advantageous Effects

As described above, according to the present invention, since the movement effect of lithium ions is improved by including at least one unit derived from a polymer containing both lithium ions (Li$^+$) and a sulfonate group in a structure, a polymer electrolyte having high ionic conductivity may be prepared. Also, a lithium secondary battery having improved cycle life characteristics and oxidation stability may be prepared by including the polymer electrolyte.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a graph illustrating results of evaluating cycle life characteristics of a lithium secondary battery according to Experimental Example 1 of the present invention.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Unless otherwise specified in the present invention, the expression "*" denotes the same or different atom or a portion connected between ends of a formula.

Hereinafter, a polymer electrolyte for a secondary battery and a secondary battery including the same will be described in more detail.

In Formula 1 or 2,
R and $R_5$ are carbon (C) or sulfur (S),
$R_1$ and $R_6$ are

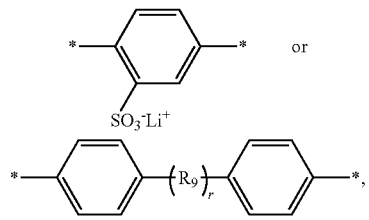

wherein $R_9$ is —C(CF$_3$)$_2$—,
$R_2$ and $R_7$ are

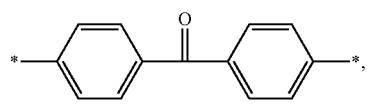

$R_3$ is —S(CF$_2$)$_2$SO$_3^-$Li$^+$,
$R_4$ is

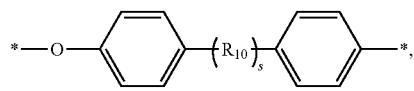

wherein $R_{10}$ is —C(CF$_3$)$_2$—,
$R_8$ is

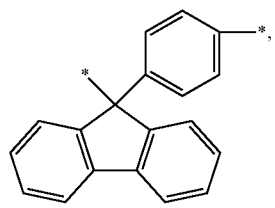

o and o' are 1 or 2, p, p', q, q', r, and s are 0 or 1, each of n, m, n', and m' is the number of moles of repeating units, a ratio of n:m is in a range of 95:5 to 5:95, and a ratio of n':m' is in a range of 95:5 to 5:95.

Specifically, in Formula 1, the ratio of n:m may be in a range of 40:60 to 60:40, and, in Formula 2, the ratio of n':m' may be in a range of 40:60 to 60:40.

In this case, in the repeating unit represented by Formula 1 or Formula 2, n, m, n', and m' each independently denote the number of moles of repeating units, wherein, in the repeating units represented by Formula 1 or 2, n, m, n', and m' may be alternatingly, graftedly, or randomly arranged while having predetermined rules between one another or having no rules.

Specifically, in Formula 1, the ratio of n:m may be in a range of 40:60 to 60:40, for example, 50:50.

Also, in Formula 2, the ratio of n':m' may be in a range of 40:60 to 60:40, for example, 50:50.

The polymer including the repeating unit represented by Formula 1 or Formula 2 may have a weight-average molecular weight (Mw) of 5,000 g/mol to 2,000,000 g/mol, for example, 500,000 g/mol to 1,000,000 g/mol.

When the weight-average molecular weight of the polymer is within the above range, chemical and physical properties as well as stability with respect to an electrolyte solution are excellent. In this case, the weight-average molecular weight (Mw) of the repeating unit (A) represented by Formula 1 or Formula 2 may be measured using gel permeation chromatography (GPC). For example, a sample having a predetermined concentration is prepared, and Alliance 4, a GPC measurement system, is then stabilized.

When the system is stabilized, a standard sample and the sample are injected into the system to obtain a chromatogram, and a molecular weight may then be calculated using an analytical method (system: Alliance 4, Column: Ultrahydrogel linear x 2, eluent: 0.1M $NaNO_3$ (pH 7.0 phosphate buffer, flow rate: 0.1 mL/min, temp: 40° C., injection: 100 μL)).

Specifically, in the polymer electrolyte for a secondary battery according to the embodiment of the present invention, the repeating unit represented by Formula 1 may include at least one selected from the group consisting of those represented by the following Formulae 1a to 1c.

[Formula 1a]

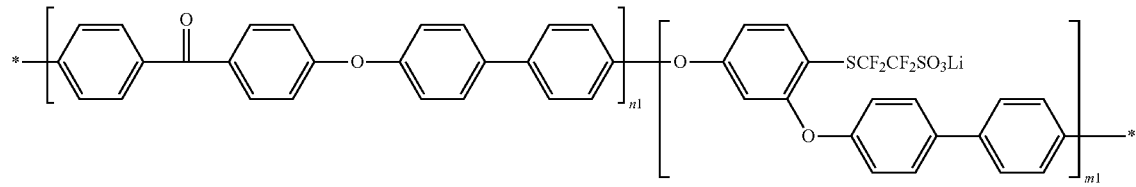

In Formula 1a, n1 and m1 are the number of moles of repeating units, and a ratio of n1:m1 is in a range of 95:5 to 5:95.

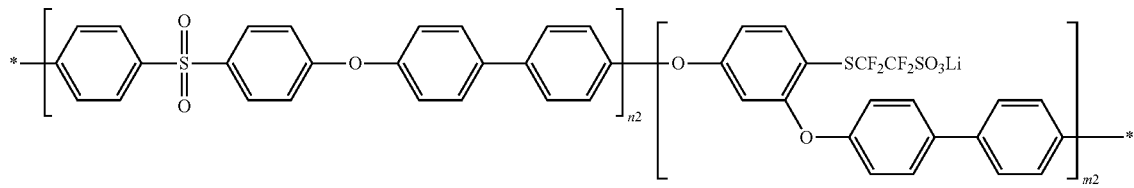

[Formula 1b]

In Formula 1b,
n2 and m2 are the number of moles of repeating units, and a ratio of n2:m2 is in a range of 95:5 to 5:95.

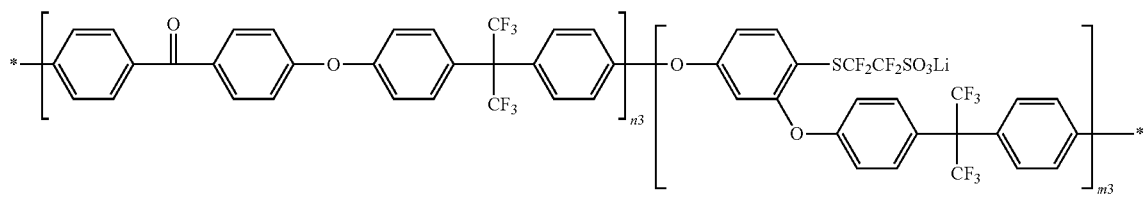

[Formula 1c]

In Formula 1c,
n3 and m3 are the number of moles of repeating units, and a ratio of n3:m3 is in a range of 95:5 to 5:95.

Also, the repeating unit represented by Formula 2 may include one represented by the following Formula 2a.

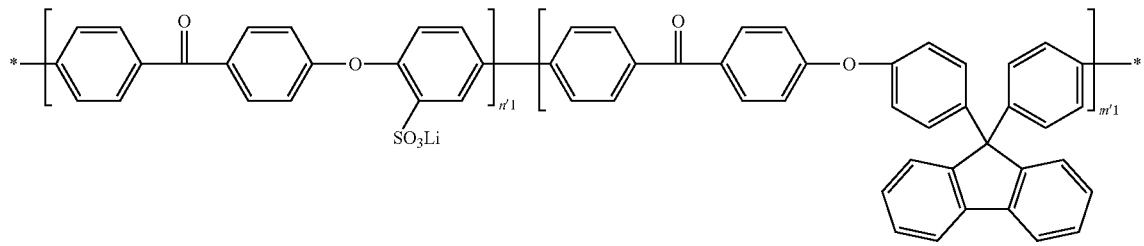

[Formula 2a]

In Formula 2a,
n'1 and m'1 are the number of moles of repeating units, and
a ratio of n'1:m'1 is in a range of 95:5 to 5:95.

The polymer electrolyte of the present invention may be a free-standing solid polymer electrolyte which includes the polymer including the repeating unit represented by Formula 1 or Formula 2.

In a case in which the polymer electrolyte of the present invention is the free-standing solid polymer electrolyte, since a $Li^+$ ion source is present in the polymer including the repeating unit represented by Formula 1 and the polymer including the repeating unit represented by Formula 2, operation of the battery in the form of an all solid-ion battery may be possible without the use of a conventional lithium salt-containing liquid electrolyte.

The free-standing solid polymer electrolyte of the present invention may be formed by a conventional solution casting method known in the art. That is, after at least one of the repeating units represented by Formulae 1 and 2 is dissolved in an organic solvent to be prepared in the form of a coating solution, the coating solution may be flow-coated (cast) on a support base material and dried to be prepared in the form of a film. In this case, the support base material may include a glass substrate, polyethylene terephthalate (PET), Teflon, or a fluorinated ethylene propylene (FEP) film.

As the organic solvent used in the preparation of the free-standing solid polymer electrolyte of the present invention, a volatile organic solvent having a low boiling point may be used so that the organic solvent is easily removed, and typical examples of the organic solvent may include at least one selected from the group consisting of N,N'-dimethylacetamide, N-methyl-2-pyrrolidone (NMP), dimethylsulfoxide (DMSO), N,N-dimethylformamide (DMF), and acetonitrile (AN). Specifically, N-methyl-2-pyrrolidone may be used.

An amount of the organic solvent used is not particularly limited as long as the organic solvent is used in an amount such that the polymer including the repeating unit represented by Formula 1 or Formula 2 is dissolved and coated to a uniform thickness, and then easily removed, but the organic solvent may be used in an amount of about 100 parts by weight to about 10,000 parts by weight, for example, 1,000 parts by weight to 5,000 parts by weight, based on 100 parts by weight of the polymer including the repeating unit represented by Formula 1 or Formula 2.

In a case in which the amount of the organic solvent used is greater than 10,000 parts by weight, it is not only difficult to remove the organic solvent within a short period of time, but it is also difficult to sufficiently secure effects of mechanical properties, thin-film thickness, and ionic conductivity of the polymer electrolyte due to the residual organic solvent. Also, in a case in which the amount of the organic solvent used is less than 100 parts by weight, since it is difficult to dissolve the repeating unit represented by Formula 1 or Formula 2, uniformity of the film may be reduced during the molding of the polymer electrolyte.

With respect to a typical polymer electrolyte until now, it is disadvantageous in that it has low ionic conductivity because movement speed of lithium ions is low due to high resistance in the battery in comparison to a liquid electrolyte. In contrast, since the polymer including the repeating unit represented by Formula 1 or Formula 2 is in the form of a conjugated polymer to contain both lithium ions ($Li^+$) and a sulfonate group in a polymer structure, the polymer may not only suppress a side reaction of lithium ions ($Li^+$) and decomposition of salt due to an anion stationary phase, but may also provide free lithium ions ($Li^+$), and thus, the movement effect of the lithium ions may be improved. Therefore, with respect to the polymer electrolyte of the present invention which includes the polymer including at least one unit of the repeating unit A represented by Formula 1 and the repeating unit B represented by Formula 2, excellent mechanical properties may not only be secured, but excellent thermal, chemical, and oxidation stabilities as well as high ionic conductivity may also be achieved.

Also, in order to provide an ion transfer effect, the polymer electrolyte of the present invention may be a gel polymer electrolyte in which a lithium salt-containing electrolyte solution is used together.

That is, after the solid polymer electrolyte of the present invention which includes the polymer including the repeating unit represented by Formula 1 or Formula 2 is disposed in an electrode assembly and accommodated in a battery case, the gel polymer electrolyte (or solid-liquid mixed electrolyte) of the present invention may be prepared by a method of swelling the solid polymer electrolyte by injecting a lithium salt-containing electrolyte solution in which swelling is possible without dissolving the solid polymer electrolyte film.

In this case, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $B(C_2O_4)_2^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(FSO_2)_2N^-$, $CF_3CF_2(CF_3)_2CO^-$, $(CF_3SO_2)_2N^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion. The lithium salt may be used alone or may be used in a mixture of two or more thereof, if necessary. The lithium salt may be appropriately changed in a normally usable range, but may be included in a concentration of 0.5 M to 5 M in the polymer electrolyte in order to obtain an optimum corrosion protection film formation effect on the surface of an electrode.

Furthermore, a volatile organic solvent having a low boiling point or a volatile organic solvent having a high boiling point may all be used as the organic solvent, but, specifically, the organic solvent may include a single material selected from the group consisting of propylene carbonate (PC), ethylene carbonate (EC), butylene carbonate (BC), dimethyl carbonate (DMC), diethyl carbonate (DEC), ethylmethyl carbonate (EMC), fluoroethylene carbonate (FEC), γ-butyrolactone (GBL), 1,2-dimethoxy ethane, tetrahydroxyfuran, 2-methyl tetrahydrofuran (THF), dimethyl sulfoxide, 1,3-dioxolane (DOL), 1,4-dioxane, formamide, diemthylformamide, dioxolane, acetonitrile, nitromethane, methyl formate, methyl acetate (MA), ethyl acetate (EA), methyl propionate (MP), ethyl propionate (EP), propyl propionate (PP), dimethoxyethane (DME), phosphate triester, diethyl ether, trimethoxy methane, triglyme, tetraglyme (TEGDME), sulfolane, methyl sulfolane, and 1,3-dimethyl-2-imidazolidinone, or a mixture of two or more thereof.

In this case, a non-volatile organic solvent having a high boiling point, such as tetraglyme, may be further used so that the organic solvent is not easily evaporated and well swells the polymer electrolyte to be able to maintain the gel polymer electrolyte form.

An amount of the organic solvent used is not particularly limited, but the organic solvent may be used within a range in which the uniformity of the film may be secured during the molding of the gel polymer electrolyte and, simultaneously, the effects of mechanical properties, thin-film thickness, and ionic conductivity may be sufficiently secured.

Also, the gel polymer electrolyte of the present invention may further include an ionic liquid, if necessary.

The ionic liquid may be used by being further injected, after the injection of the lithium salt-containing electrolyte solution.

Since the ionic liquid, as a component having high ionic conductivity, may improve the movement of lithium ions (Lit flux) in the polymer electrolyte by being impregnated alone or being impregnated with the electrolyte solution, the ionic liquid may allow a phenomenon, in which $Li^+$ ions are plated or stripped on the surface of a negative electrode, to be uniform. Thus, the ionic liquid may suppress the generation of lithium dendrites and may provide safety when used in the battery due to its flame retardant properties.

As a typical example, the ionic liquid may include at least one selected from the group consisting of diethylmethylammonium trifluoromethanesulfonate, dimethylpropylammonium trifluoromethanesulfonate, N,N-diethyl-N-methyl-N-(2-methoxyethyl)ammonium bis(trifluoromethanesulfonyl) imide, N-methyl-N-propylpiperidinium bis (trifluoromethanesulfonyl)imide, N-butyl-N-methyl pyrrolidinium bis(trifluoromethanesulfonyl)imide, and methyl propylpiperidinium trifluoromethanesulfonylimide.

The ionic liquid may be included in an amount of 50 wt % or less, particularly 0.01 wt % to 50 wt %, and more particularly 0.01 wt % to 20 wt % based on a total weight of the polymer electrolyte.

In a case in which the amount of the ionic liquid is greater than 50 wt %, since the movement of the lithium ions may be difficult due to high viscosity, a uniform lithium ion movement effect may not be provided, and thus, lithium dendrites may be formed on the surface of the lithium negative electrode.

Furthermore, in an embodiment of the present invention, provided is a lithium secondary battery including a positive electrode, a negative electrode, and a polymer electrolyte formed on at least one surface of the positive electrode and the negative electrode, wherein the polymer electrolyte includes the polymer electrolyte of the present invention.

The polymer electrolyte may include a free-standing solid polymer electrolyte or gel polymer electrolyte.

Specifically, the lithium secondary battery of the present invention may be prepared by the following steps.

First, the positive electrode may be prepared by forming a positive electrode material mixture layer on a positive electrode collector.

The positive electrode material mixture layer may be prepared by coating the positive electrode collector with a positive electrode active material slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}CO_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$ etc.).

The positive electrode active material may be included in an amount of 40 wt % to 90 wt %, for example, 40 wt % to 75 wt % based on a total weight of solid content in the positive electrode active material slurry.

The binder is a component that assists in the binding between the active material and the conductive agent and in the binding with the current collector, wherein the binder is commonly added in an amount of 1 wt % to 30 wt % based on the total weight of the solid content in the positive electrode active material slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the solid content in the positive electrode active material slurry.

Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, and thermal black; graphite powder such as natural graphite having a highly developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

Those commercially available under the names of acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon) may also be used as the conductive agent.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 60 wt %, for example, 20 wt % to 50 wt %.

Also, the negative electrode may be prepared by forming a negative electrode material mixture layer on a negative electrode collector. The negative electrode material mixture layer may be formed by coating the negative electrode collector with a negative electrode active material slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material. The negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metals or alloys of lithium and these metals, a metal composite oxide, a material which may be doped and undoped with lithium, and a transition metal oxide.

As the carbon material capable of reversibly intercalating/deintercalating lithium ions, any carbon material may be used without particular limitation so long as it is a carbon-based negative electrode active material generally used in a lithium ion secondary battery, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metals or alloys of lithium and these metals, metals selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn) or alloys of lithium and these metals may be used.

One selected from the group consisting of PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, Bi$_2$O$_5$, Li$_x$Fe$_2$O$_3$ ($0 \leq x \leq 1$), Li$_x$WO$_2$ ($0 \leq x \leq 1$), Sn$_x$Me$_{1-x}$Me'$_y$O$_z$ (Me: manganese (Mn), iron (Fe), Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, SiO$_x$ ($0 < x < 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, SnO$_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of SiO$_2$ and at least one thereof may also be used. The element Y may be selected from the group consisting of Mg, Ca, Sr, Ba, radium (Ra), scandium (Sc), yttrium (Y), titanium (Ti), zirconium (Zr), hafnium (Hf), vanadium (V), niobium (Nb), tantalum (Ta), dubidium (Db), chromium (Cr), molybdenum (Mo), tungsten (W), seaborgium (Sg), Tc (technetium), rhenium (Re), Bh (bohrium), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, indium (In), Ge, phosphorus (P), arsenic (As), Sb, bismuth (Bi), sulfur (S), selenium (Se), tellurium (Te), Po (polonium), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode active material slurry.

The binder is a component that assists in the binding between the conductive agent, the active material, and the current collector, wherein the binder is commonly added in an amount of 1 wt % to 30 wt % based on the total weight of the solid content in the negative electrode active material slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode active material slurry. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as N-methyl-2-pyrrolidone (NMP) and alcohol, and may be used in an amount such that desirable viscosity is obtained when the negative electrode active material as well as selectively the binder and the conductive agent are included.

For example, the solvent may be included in an amount such that a concentration of the solid content in the slurry including the negative electrode active material as well as selectively the binder and the conductive agent is in a range of 50 wt % to 75 wt %, for example, 50 wt % to 65 wt %.

Also, the lithium secondary battery of the present invention may further include a separator, if necessary.

The separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 µm to 50 µm and a porosity of 5% to 95%. Also, the porous separator may generally have a thickness of 5 µm to 300 µm.

Next, in the secondary battery of the present invention, the polymer electrolyte of the present invention is disposed on at least one surface of the positive electrode and the negative electrode, or at least one surface of the positive electrode, the negative electrode, and the separator.

In this case, as described above, ① after the polymer including the repeating unit represented by Formula 1 or Formula 2 is used to prepare in the form of a film, the polymer electrolyte in the form of a film is disposed (introduced) on at least one surface of the prepared negative electrode, positive electrode, and separator, ② after dissolving the polymer including the repeating unit represented by Formula 1 or Formula 2 in an organic solvent to prepare a coating solution, the polymer electrolyte may be disposed by directly coating at least one surface of the prepared negative electrode, positive electrode, and separator with the coating solution and then drying the coated surface, or ③ after a solid polymer electrolyte film is formed on at least one surface of the negative electrode, positive electrode, and separator by the above method, a liquid electrolyte is further injected to swell the solid polymer electrolyte, and thus, the polymer electrolyte may be prepared in the form of a gel polymer electrolyte (solid-liquid mixed electrolyte).

In this case, a thickness of the polymer electrolyte in the form of a film may be as thin as possible in consideration of ionic conductivity, but the thickness may be in a range of 0.5 µm to 300 µm. In a case in which the thickness of the electrolyte film is less than 0.5 µm, since the strength of the film is significantly reduced, it is difficult to be used as an electrolyte film. In a case in which the thickness of the electrolyte film is greater than 300 µm, since it is difficult for a proton ($Li^+$), as an ion transporter, to pass through the film and a volume for each secondary battery stack is increased, it may be difficult to prepare a secondary battery having high energy density.

As described above, in the present invention, since the polymer electrolyte, which includes the polymer including at least one repeating unit of the repeating unit A represented by Formula 1 and the repeating unit B represented by Formula 2, is introduced into components of the lithium secondary battery, mechanical properties may be secured and, simultaneously, ionic conductivity may be improved to achieve cycle life characteristics and high output effect.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Electrode Preparation)

A positive electrode active material slurry was prepared by adding 92 wt % of a 4.2 V-class $LiCoO_2$ compound as a positive electrode active material, 4 wt % of carbon black as a conductive agent, and 2 wt % of polyvinylidene fluoride (PVDF), as a binder component, to N-methyl-2-pyrrolidone (NMP) as a solvent.

A surface of a 20 µm thick aluminum (Al) thin film was coated with the positive electrode active material slurry to a thickness of 10 µm and then dried to prepare a positive electrode plate having a positive electrode material mixture layer formed thereon.

A copper (Cu) thin film was coated with lithium metal and then rolled to prepare a 20 µm thick negative electrode plate.

(Polymer Electrolyte Preparation)

After 10 g of a polymer including the repeating unit represented by Formula 1a (weight-average molecular weight (Mw) 743,000, m1=50, n1=50) was added to 200 g of NMP and stirred to prepare a mixed solution, at least one surface of the positive electrode plate was coated with the mixed solution and the organic solvent was entirely removed to prepare a solid polymer electrolyte having a thickness of 50 µm.

(Secondary Battery Preparation)

An electrode assembly was prepared by disposing a polyolefin-based separator (thickness: 20 µm) between the prepared negative electrode and positive electrode including the polymer electrolyte, and the electrode assembly was accommodated in a pouch type battery case to prepare a 4.2 V-class lithium secondary battery (full cell).

Example 2

A solid polymer electrolyte and a 4.2 V-class lithium secondary battery including the same were prepared in the same manner as in Example 1 except that a polymer including the repeating unit represented by Formula 1b (weight-average molecular weight (Mw) 936,000, m2=50, n2=50) was used instead of the polymer including the repeating unit represented by Formula 1a during the preparation of the polymer electrolyte in Example 1.

Example 3

A solid polymer electrolyte and a 4.2 V-class lithium secondary battery including the same were prepared in the same manner as in Example 1 except that a polymer including the repeating unit represented by Formula 1c (weight-average molecular weight (Mw) 1,300,000, m3=50, n3=50) was used instead of the polymer including the repeating unit represented by Formula 1a during the preparation of the polymer electrolyte in Example 1.

Example 4

A solid polymer electrolyte and a 4.2 V-class lithium secondary battery including the same were prepared in the same manner as in Example 1 except that a polymer including the repeating unit represented by Formula 2a (weight-average molecular weight (Mw) 660,000, m'1=50, n'1=50) was used instead of the polymer including the repeating unit represented by Formula 1a during the preparation of the polymer electrolyte in Example 1.

Example 5

A 4.2 V-class lithium secondary battery was prepared in the same manner as in Example 1 except that, after the electrode assembly was accommodated in a pouch type battery case, a non-aqueous electrolyte solution composed of an organic solvent (EC/DEC=5:5 vol %), in which 1 M LiPF$_6$ was dissolved, was further injected to prepare the 4.2 V-class secondary battery (full cell) including a gel polymer electrolyte during the preparation of the secondary battery in Example 1.

Example 6

A 4.2 V-class lithium secondary battery was prepared in the same manner as in Example 2 except that, after the electrode assembly was accommodated in a pouch type battery case, a non-aqueous electrolyte solution composed of an organic solvent (EC/DEC=5:5 vol %), in which 1 M LiPF$_6$ was dissolved, was further injected to prepare the 4.2 V-class secondary battery (full cell) including a gel polymer electrolyte during the preparation of the secondary battery in Example 2.

Example 7

A 4.2 V-class lithium secondary battery was prepared in the same manner as in Example 3 except that, after the electrode assembly was accommodated in a pouch type battery case, a non-aqueous electrolyte solution composed of an organic solvent (EC/DEC=5:5 vol %), in which 1 M LiPF$_6$ was dissolved, was further injected to prepare the 4.2 V-class secondary battery (full cell) including a gel polymer electrolyte during the preparation of the secondary battery in Example 3.

Example 8

A 4.2 V-class lithium secondary battery was prepared in the same manner as in Example 4 except that, after the electrode assembly was accommodated in a pouch type battery case, a non-aqueous electrolyte solution composed of an organic solvent (EC/DEC=5:5 vol %), in which 1 M LiPF$_6$ was dissolved, was further injected to prepare the 4.2 V-class secondary battery (full cell) including a gel polymer electrolyte during the preparation of the secondary battery in Example 4.

Example 9

A 4.2 V-class lithium secondary battery was prepared in the same manner as in Example 5 except that a 20% ionic liquid (EMIM-FSI) was further injected after the injection of the non-aqueous electrolyte solution during the preparation of the secondary battery in Example 5.

Example 10

A 4.2 V-class lithium secondary battery was prepared in the same manner as in Example 8 except that a 20% ionic liquid (EMIM-FSI) was further injected after the injection of the non-aqueous electrolyte solution during the preparation of the secondary battery in Example 8.

Comparative Example 1

A solid polymer electrolyte and a lithium secondary battery including the same were prepared in the same manner as in Example 1 except that a linear polyethylene glycol copolymer was used instead of the polymer including the repeating unit represented by Formula 1a during the preparation of the polymer electrolyte in Example 1.

Comparative Example 2

(Electrode Preparation)
A positive electrode material mixture was prepared by adding 92 wt % of a 4.2 V-class LiCoO$_2$ compound as a positive electrode active material, 4 wt % of carbon black as a conductive agent, and 2 wt % of PVDF, as a binder component, to N-methyl-2-pyrrolidone (NMP) as a solvent.

A surface of a 20 µm thick aluminum (Al) thin film was coated with the positive electrode material mixture to a thickness of 10 µm and then dried to prepare a positive electrode plate.

A Cu thin film was coated with lithium metal and then rolled to prepare a 20 µm thick negative electrode plate.
(Secondary Battery Preparation)
An electrode assembly was prepared by disposing a polyolefin-based separator (thickness: 20 µm) between the prepared negative electrode and positive electrode, and, after the electrode assembly was accommodated in a pouch type battery case, a non-aqueous electrolyte solution composed of an organic solvent (EC/DEC=5:5 vol %), in which 1 M LiPF$_6$ was dissolved, was injected to prepare a lithium secondary battery (full cell).

Comparative Example 3

A solid polymer electrolyte and a lithium secondary battery including the same were prepared in the same manner as in Comparative Example 1 except that a sulfonated polyphenylene sulfide (sPPS) copolymer was used instead of using the linear polyethylene glycol copolymer during the preparation of the polymer electrolyte in Comparative Example 1.

Comparative Example 4

A lithium secondary battery was prepared in the same manner as in Comparative Example 3 except that, after the electrode assembly was accommodated in a pouch type battery case, a non-aqueous electrolyte solution composed of an organic solvent (EC/DEC=5:5 vol %), in which 1 M LiPF$_6$ was dissolved, was further injected to prepare the 4.2 V-class secondary battery (full cell) including a gel polymer electrolyte during the preparation of the secondary battery in Comparative Example 3.

Comparative Example 5

A lithium secondary battery was prepared in the same manner as in Comparative Example 1 except that, after the electrode assembly was accommodated in a pouch type battery case, a non-aqueous electrolyte solution composed of an organic solvent (EC/DEC=5:5 vol %), in which 1 M LiPF$_6$ was dissolved, was further injected to prepare the 4.2 V-class secondary battery (full cell) including a gel polymer electrolyte during the preparation of the secondary battery in Comparative Example 1.

Experimental Examples

Experimental Example 1. Cycle Life Characteristic Evaluation Test of Secondary Battery Including Solid Polymer Electrolyte After the lithium secondary batteries prepared in Examples 1 to 4 and the lithium secondary batteries prepared in Comparative Examples 1 and 3 were respectively cycled 100 times at charge and discharge rates of 0.2 C/0.5 C at 25° C., charge and discharge capacities of each lithium secondary battery were measured based on a state of charge (SOC) of 80% at room temperature (25° C.).

A capacity retention rate (%), as a ratio of discharge capacity in a $50^{th}$ cycle to initial capacity, was measured, and its value is presented in FIG. 1 and Table 1 below.

TABLE 1

|  | Cycle life (n) (SOC 80% retention) |
|---|---|
| Example 1 | 32 |
| Example 2 | 57 |
| Example 3 | 47 |
| Example 4 | 60 |
| Comparative Example 1 | 13 |
| Comparative Example 3 | 5 |

As illustrated in Table 1 and FIG. 1, with respect to the lithium secondary batteries including the solid polymer electrolytes prepared in Examples 1 to 4, it may be understood that cycle life characteristics were improved in comparison to the lithium secondary batteries including the solid polymer electrolytes prepared in Comparative Examples 1 and 3.

It was predicted that this was due to the effect of uniform reflux of lithium ions occurred during the operation of the batteries, because the formation of dendrites on the surface of the lithium metal was suppressed by the solid polymer electrolyte films introduced in Examples 1 to 4 and a degree of freedom of lithium ions was increased by an anion stationary phase in the solid polymer electrolytes.

Experimental Example 2. Cycle Life Characteristic Evaluation Test of Secondary Battery Including Gel Polymer Electrolyte (2)

After the lithium secondary batteries prepared in Examples 5 to 8 and 10 and the lithium secondary batteries prepared in Comparative Examples 2, 4, and 5 were cycled 100 times at charge and discharge rates of 0.2 C/0.5 C at 25° C., charge and discharge capacities of each lithium secondary battery were measured based on an SOC of 80% at room temperature (25° C.).

A capacity retention rate (%), as a ratio of discharge capacity in a $50^{th}$ cycle to initial capacity, was measured, and its value is presented in Table 2 below.

TABLE 2

|  | Cycle life (n) (SOC 80% retention) |
|---|---|
| Example 5 | 78 |
| Example 6 | 112 |
| Example 7 | 95 |
| Example 8 | 120 |
| Example 10 | 118 |
| Comparative Example 2 | 55 |
| Comparative Example 4 | 38 |
| Comparative Example 5 | 49 |

As illustrated in Table 2, with respect to the lithium secondary batteries including the gel polymer electrolytes of Examples 5 to 8 and 10, it may be understood that cycle life characteristics were improved in comparison to those of the lithium secondary battery including the liquid electrolyte solution of Comparative Example 2 and those of the lithium secondary batteries including the gel polymer electrolytes of Comparative Examples 4 and 5.

Particularly, with respect to Comparative Example 5, it may be understood that life characteristics were degraded because the polymer electrolyte film in the form of a film was not maintained while being significantly swollen by the liquid electrolyte solution further injected.

Experimental Example 3. Ionic Conductivity Evaluation of Gel Polymer Electrolyte The gel polymer electrolytes prepared in Examples 5 to 8 and 10 and the gel polymer electrolytes prepared in Comparative Examples 4 and 5 were injected into a band-type conductive glass substrate or a lithium-copper foil, polymerized by thermal curing, and sufficiently dried. Then, AC impedance values of band-type or sandwich-type electrodes were measured in an argon atmosphere, ionic conductivity was measured by a method in which complex impedance was interpreted by analyzing the measured impedance value with a frequency response analyzer, and the results thereof are presented in Table 3 below.

With respect to the band-type electrode, a cell was prepared by attaching a masking tape having a width of about 1 mm to conductive glass (ITO) at an interval of 2 cm, putting the conductive glass in an etching solution to perform etching, and then washing and drying the conductive glass, and the cell was used. The ionic conductivity was measured in a frequency range of 0.1 Hz to 100 MHz using a VMP3 measurement instrument and 4294A.

TABLE 3

|  | Ionic conductivity (S/cm) |
|---|---|
| Example 5 | $1.2 \times 10^{-4}$ |
| Example 6 | $3 \times 10^{-4}$ |
| Example 7 | $2 \times 10^{-4}$ |
| Example 8 | $4 \times 10^{-4}$ |
| Example 10 | $3 \times 10^{-4}$ |
| Comparative Example 4 | $3 \times 10^{-6}$ |
| Comparative Example 5 | $6 \times 10^{-5}$ |

As illustrated in Table 3, with respect to the gel polymer electrolytes prepared in Examples 5 to 8 and 10, the ionic conductivities were about $1.2 \times 10^4$ S/cm or more. In contrast, the ionic conductivity of the gel polymer electrolyte prepared in Comparative Example 4 was 3×10 6 S/cm and the ionic conductivity of the gel polymer electrolyte prepared in Comparative Example 5 was $6 \times 10^{-5}$ S/cm, wherein it may be understood that the ionic conductivities were significantly reduced in comparison to those of the gel polymer electrolytes prepared in Examples 5 to 8 and 10.

Experimental Example 4. Electrochemical Stability Evaluation of Solid and Gel Polymer Electrolytes Electrochemical (oxidation) stabilities of the lithium secondary batteries prepared in Examples 1 to 9 and the secondary batteries prepared in Comparative Examples 1 and 2 were measured up to 7 V at 60° C. using linear sweep voltammetry (LSV) or cyclic voltammetry. The results thereof are presented in Table 4 below.

TABLE 4

| | Oxidation stability (V) @60° C. |
|---|---|
| Example 1 | 5.9~ |
| Example 2 | 5.9~ |
| Example 3 | 5.9~ |
| Example 4 | 5.9~ |
| Example 5 | 5.0 |
| Example 6 | 4.9 |
| Example 7 | 5.3 |
| Example 8 | 5.2 |
| Example 9 | 5.7 |
| Comparative Example 1 | 3.8 |
| Comparative Example 2 | 4.5 |

As illustrated in Table 4, with respect to the lithium secondary batteries prepared in Examples 1 to 9, oxidations occurred in a high voltage range of about 4.9 V or more, but, with respect to the lithium secondary batteries prepared in Comparative Examples 1 and 2, it may be understood that oxidations occurred at 3.8 V and 4.5 V, respectively. Thus, it may be understood that, in a high voltage range, the secondary batteries of Examples 1 to 9 had significantly improved oxidation stability in comparison to the secondary batteries of Comparative Examples 1 and 2.

Experimental Example 5. Tensile Strength Evaluation of Solid Polymer Electrolyte Mechanical strength tests were performed on the solid polymer electrolytes prepared in Example 1 to 4 and the solid polymer electrolyte prepared in Comparative Example 3 through the measurement of tensile strength.

In this case, electrolyte specimens were prepared according to ASTM standard D638 (Type V specimens), and the tensile strength was measured at a tensile rate of 5 mm per minute at 25° C. and a relative humidity of about 30% using Lloyd LR-10K. The results thereof are presented in Table 5 below.

TABLE 5

| | Tensile strength (kPa) |
|---|---|
| Example 1 | 38 |
| Example 2 | 15 |
| Example 3 | 26 |
| Example 4 | 6 |
| Comparative Example 3 | 0.1 |

As illustrated in Table 5, the tensile strengths of the solid polymer electrolytes prepared in Example 1 to 4 were 6 kPa or more, wherein it may be understood that mechanical properties were improved in comparison to those of the solid polymer electrolyte prepared in Comparative Example 3 (0.1 kPa).

The invention claimed is:

1. A polymer electrolyte for a secondary battery, the polymer electrolyte comprising a polymer which includes at least one repeating unit of repeating unit A represented by Formula 1 and repeating unit B represented by Formula 2:

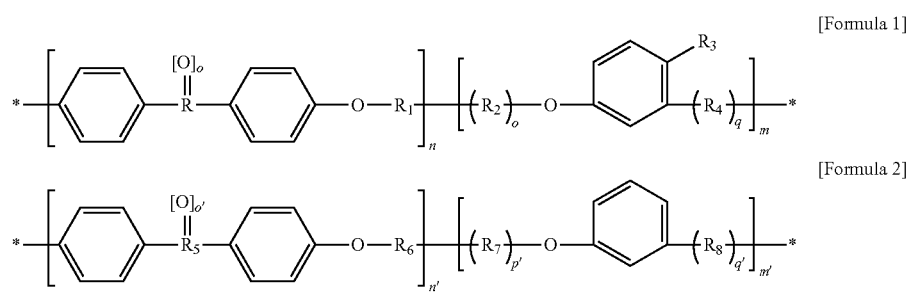

wherein, in Formula 1 or 2,

R and $R_5$ are carbon (C) or sulfur (S), $R_1$ and $R_6$ are

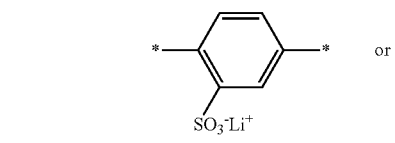

wherein $R_9$ is $-C(CF_3)_2-$, $R_2$ and $R_7$ are

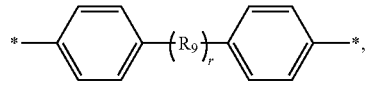

$R_3$ is $-S(CF_2)_2SO_3^-Li^+$, $R_4$ is

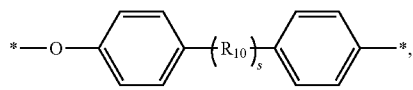

wherein $R_{10}$ is —C(CF$_3$)$_2$—, $R_8$ is

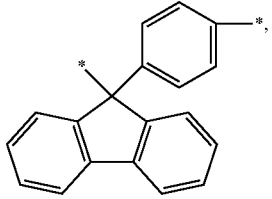

o and o' are 1 or 2, p, p', q, q', r, and s are 0 or 1, each of n, m, n', and m' is the number of moles of repeating units, a ratio of n:m is in a range of 95:5 to 5:95, and a ratio of n':m' is in a range of 95:5 to 5:95.

2. The polymer electrolyte for a secondary battery of claim 1, wherein, in Formula 1, the ratio of n:m is in a range of 40:60 to 60:40, and in Formula 2, the ratio of n':m' is in a range of 40:60 to 60:40.

3. The polymer electrolyte for a secondary battery of claim 1, wherein, in Formula 1, the ratio of n:m is 50:50, and in Formula 2, the ratio of n':m' is 50:50.

4. The polymer electrolyte for a secondary battery of claim 1, wherein the polymer including the repeating unit represented by Formula 1 or the polymer including the repeating unit represented by Formula 2 has a weight-average molecular weight (Mw) of 5,000 g/mol to 2,000,000 g/mol.

5. The polymer electrolyte for a secondary battery of claim 1, wherein the polymer including the repeating unit represented by Formula 1 or the polymer including the repeating unit represented by Formula 2 has a weight-average molecular weight (Mw) of 500,000 g/mol to 1,000,000 g/mol.

6. The polymer electrolyte for a secondary battery of claim 1, wherein the repeating unit represented by Formula 1 comprises at least one selected from the group consisting of those represented by Formulae 1a to 1c:

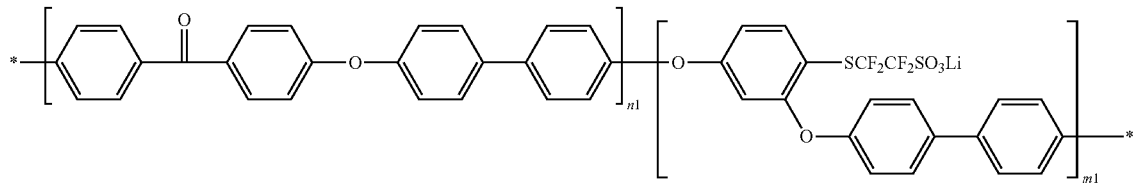

[Formula 1a]

wherein, in Formula 1a, n1 and m1 are the number of moles of repeating units, and a ratio of n1:m1 is in a range of 95:5 to 5:95,

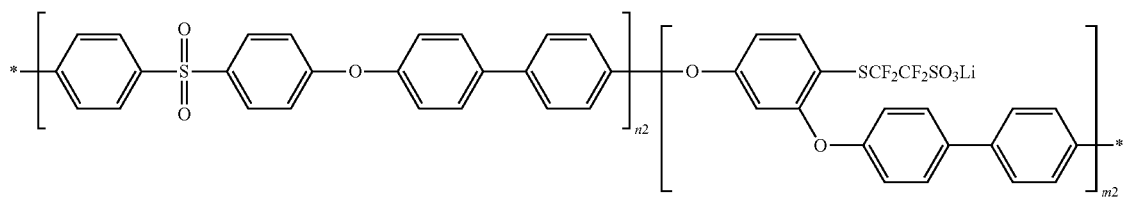

[Formula 1b]

wherein, in Formula 1b,
n2 and m2 are the number of moles of repeating units, and
a ratio of n2:m2 is in a range of 95:5 to 5:95,

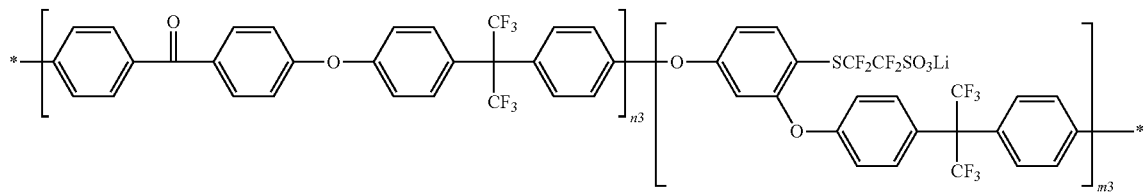

[Formula 1c]

wherein, in Formula 1c,
n3 and m3 are the number of moles of repeating units, and
a ratio of n3:m3 is in a range of 95:5 to 5:95.

7. The polymer electrolyte for a secondary battery of claim 1, wherein the repeating unit represented by Formula 2 comprises one represented by Formula 2a:

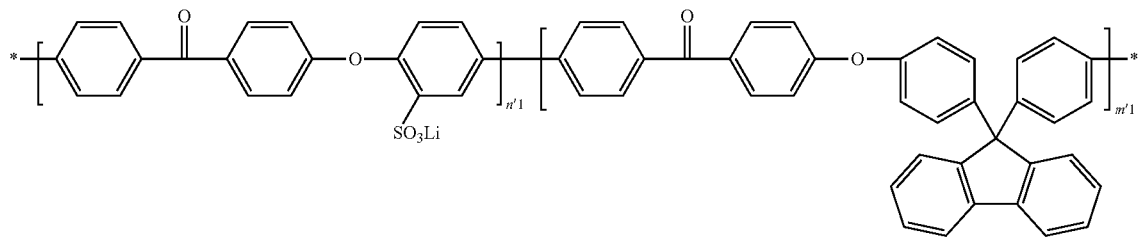

[Formula 2a]

wherein, in Formula 2a,
n'1 and m'1 are the number of moles of repeating units, and
a ratio of n'1:m'1 is in a range of 95:5 to 5:95.

8. The polymer electrolyte for a secondary battery of claim 1, wherein the polymer electrolyte is a free-standing solid polymer electrolyte.

9. The polymer electrolyte for a secondary battery of claim 1, wherein the polymer electrolyte is a gel polymer electrolyte further including a lithium salt-containing electrolyte solution.

10. The polymer electrolyte for a secondary battery of claim 9, wherein the gel polymer electrolyte further comprises an ionic liquid.

11. The polymer electrolyte for a secondary battery of claim 10, wherein the ionic liquid comprises at least one selected from the group consisting of diethylmethylammonium trifluoromethanesulfonate, dimethylpropylammonium trifluoromethanesulfonate, N,N-diethyl-N-methyl-N-(2-methoxyethyl)ammonium bis(trifluoromethanesulfonyl)imide, N-methyl-N-propylpiperidinium bis(trifluoromethanesulfonyl)imide, N-butyl-N-methyl pyrrolidinium bis(trifluoromethanesulfonyl)imide, and methyl propylpiperidinium trifluoromethanesulfonylimide.

12. The polymer electrolyte for a secondary battery of claim 10, wherein the ionic liquid is included in an amount of 0.01 wt % to 50 wt % based on a total weight of the polymer electrolyte.

13. A lithium secondary battery comprising:
    a positive electrode;
    a negative electrode; and
    a polymer electrolyte formed on at least one surface of the positive electrode and the negative electrode,
    wherein the polymer electrolyte comprises the polymer electrolyte for a secondary battery of claim 1.

14. The lithium secondary battery of claim 13, further comprising a separator,
    wherein the polymer electrolyte is formed on at least one surface of the positive electrode, the negative electrode, and the separator.

\* \* \* \* \*